(12) United States Patent
Damman et al.

(10) Patent No.: US 7,303,359 B1
(45) Date of Patent: Dec. 4, 2007

(54) PIPE REINFORCEMENT SYSTEM AND METHOD

(75) Inventors: Patrick B. Damman, Girard, KS (US); Robert N. Allison, Grove, OK (US)

(73) Assignee: Progressive Products, Inc., Pittsburg, KS (US)

(*) Notice: Subject to any disclaimer, the term of this patent is extended or adjusted under 35 U.S.C. 154(b) by 0 days.

(21) Appl. No.: 11/523,916

(22) Filed: Sep. 20, 2006

(51) Int. Cl.
*F16L 55/00* (2006.01)

(52) U.S. Cl. .................. 405/184.1; 138/97; 138/99; 285/16; 406/193

(58) Field of Classification Search ............ 405/184.1, 405/184.4, 157, 154.1; 138/97–99; 285/16; 406/193
See application file for complete search history.

(56) References Cited

U.S. PATENT DOCUMENTS

| | | | | |
|---|---|---|---|---|
| 3,833,267 A | * | 9/1974 | McCumber | 406/193 |
| 4,130,300 A | * | 12/1978 | Sheridan | 285/16 |
| 4,251,170 A | * | 2/1981 | Sheridan | 406/197 |
| 4,590,108 A | * | 5/1986 | Nippe | 138/149 |
| 4,627,995 A | * | 12/1986 | Botsolas | 285/47 |

* cited by examiner

*Primary Examiner*—Frederick L. Lagman
(74) *Attorney, Agent, or Firm*—Intellectual Property Center, LLC; Arthur K. Shaffer

(57) ABSTRACT

A pipe reinforcement system for reinforcing a pipe including a pipe section having an inner and an outer elbow surface separated by a pipe opening with a plurality of ceramic tiles overlying the pipe section, each of said tiles having a generally arcuate inner surface, said plurality of tiles secured to said pipe section with said inner arcuate surface positioned adjacent to said outer elbow surface.

4 Claims, 3 Drawing Sheets

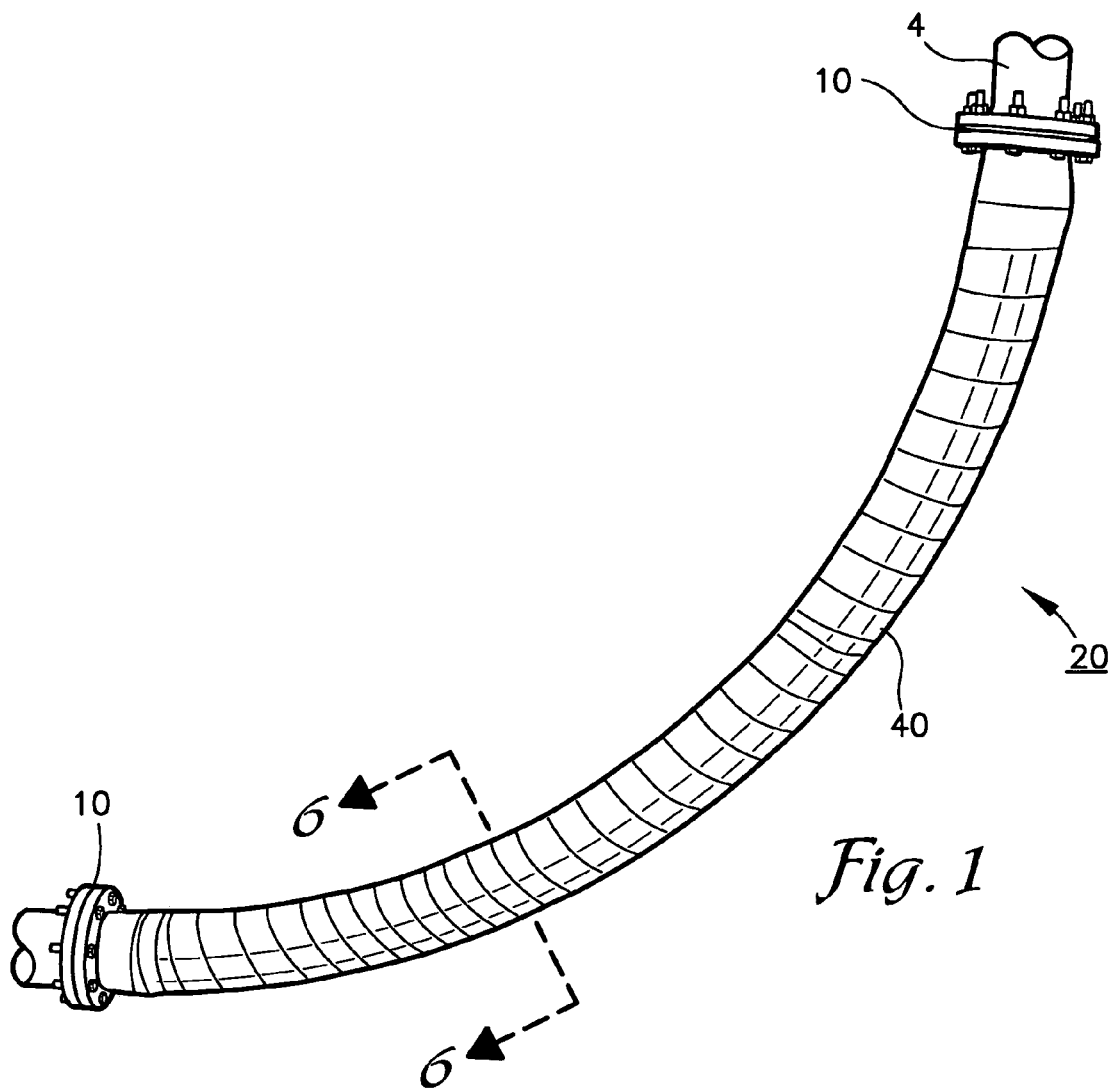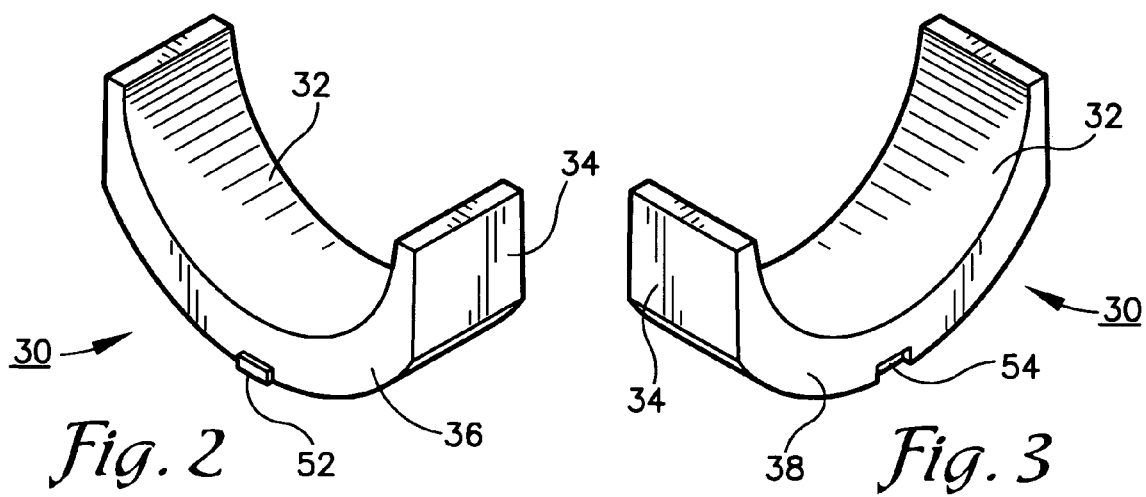

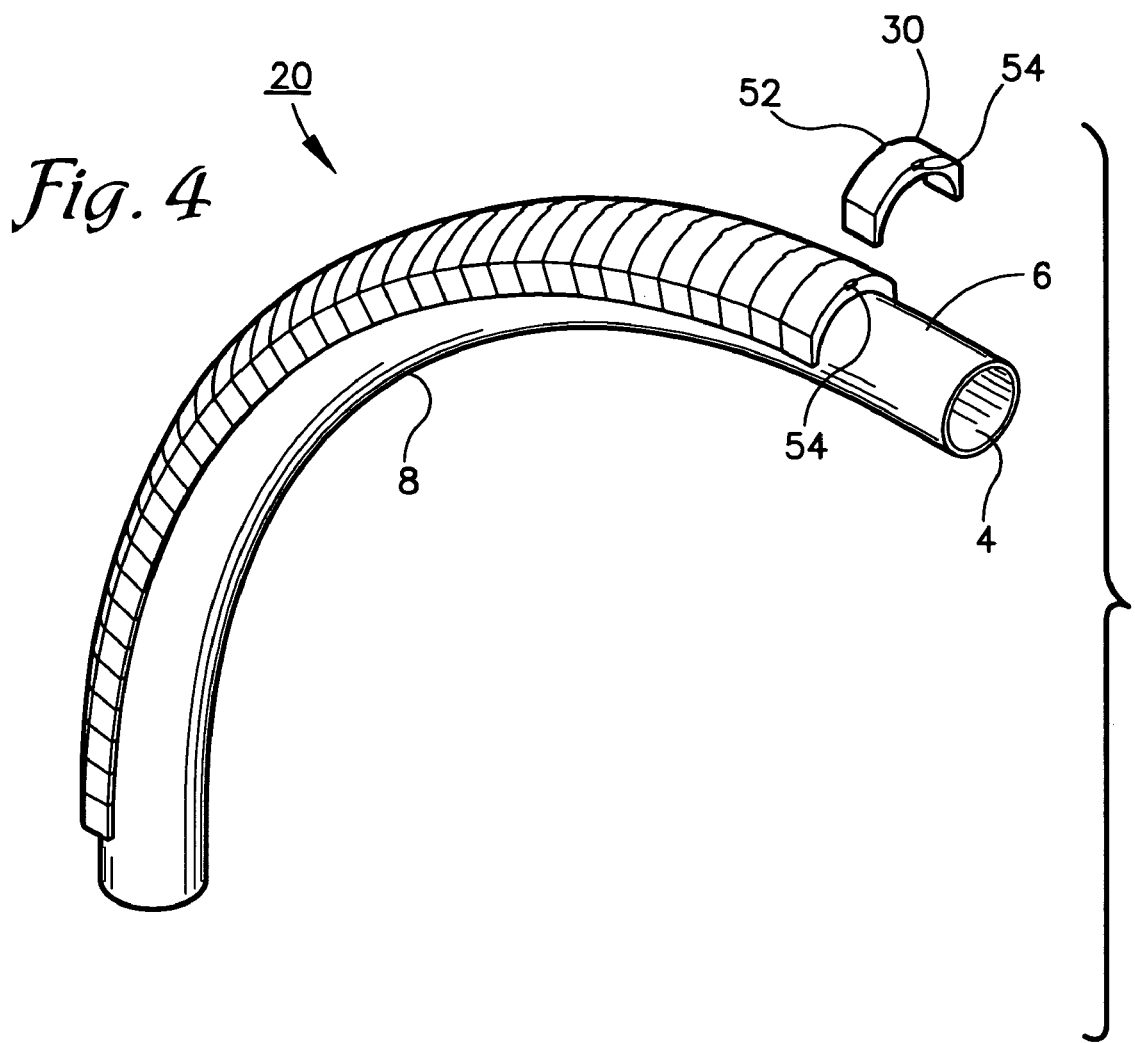
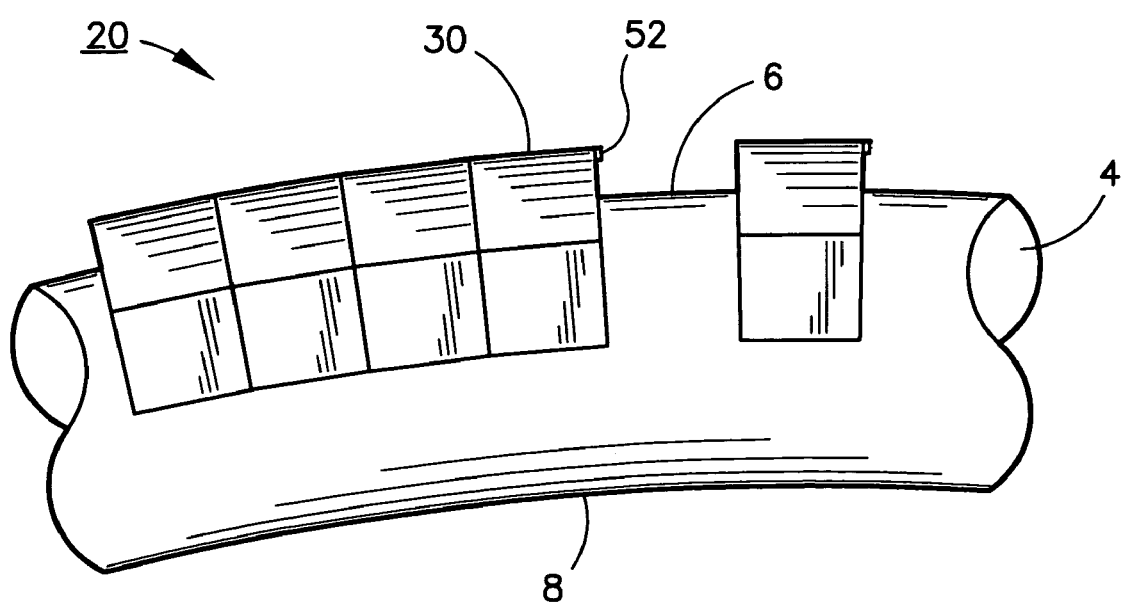

PIPE REINFORCEMENT SYSTEM AND METHOD

FIELD OF THE INVENTION

The present invention relates generally to pipe reinforcement systems and more particularly to a new ceramic tile reinforcement system for pipes which convey abrasive material.

BACKGROUND OF THE INVENTION

Industrial, commercial, chemical and Process pipe which convey abrasive materials are subject to wear and tear based on the frictional forces exerted against the process pipe while conveying the abrasive materials. Over time the process pipe may need to be replaced or repaired. It would therefore be beneficial to provide a pipe reinforcing system which reduces the need to repair or replace the worn pipe section.

In addition, elbow or arcuate pipe sections are susceptible to excessive wear and tear due to the conveyed abrasive materials through the curved surface. In the arcuate pipe section, the abrasive materials may impact the outer pipe sidewall causing accelerated deterioration of the pipe outer sidewall, while having little impact on the pipe inner sidewall. Therefore, while the inner pipe section may be structurally intact, the outer portion may need to be repaired or replaced. It would therefore be beneficial to provide a pipe reinforcement system which reinforces the pipe outer sidewall in an arcuate pipe section thus reducing the need to replace the whole pipe section prematurely.

While ceramic, silicate or aluminate tiles may be used to reinforce the pipe section, the tiles may be difficult to align over the pipe outer elbow surface or they may become loose over time. It would therefore, be beneficial to provide a pipe reinforcement system with a aligning or engaging structure for aligning the tiles and a tile support for positioning the tiles along the pipe surface.

SUMMARY OF THE INVENTION

The present invention provides a pipe reinforcement system for reinforcing a pipe such as the type used in commercial, industrial or manufacturing processes for conveying abrasive materials. The pipe reinforcement system includes a pipe having an inner and an outer elbow surface separated by a pipe opening. A plurality of ceramic tiles overlie the pipe section, each tile having a generally arcuate inner surface. A tile support is also provided which secures the tiles to the pipe section for positioning the inner arcuate surface in contact with the outer elbow surface.

BRIEF DESCRIPTION OF THE DRAWINGS

The drawings constitute a part of this invention and include exemplary embodiments of the present invention and illustrate various objects and features thereof.

FIG. 1 is a perspective view of the pipe reinforcement system in accordance with one embodiment of the present invention.

FIG. 2 is a first side perspective view of a ceramic tile according to the embodiment of FIG. 1.

FIG. 3 is second side perspective view of a ceramic tile according to the embodiment of FIG. 1.

FIG. 4 is an exploded perspective view of the embodiment of FIG. 1 with a plurality of the tiles overlying the pipe section, one of the tiles being spaced from the elbow.

FIG. 5 is a partial view of the embodiment of FIG. 1 with the tiles overlying the elbow, one of the tiles removed for illustrational purposes only.

DETAILED DESCRIPTION

I. Introduction

Figure 6:
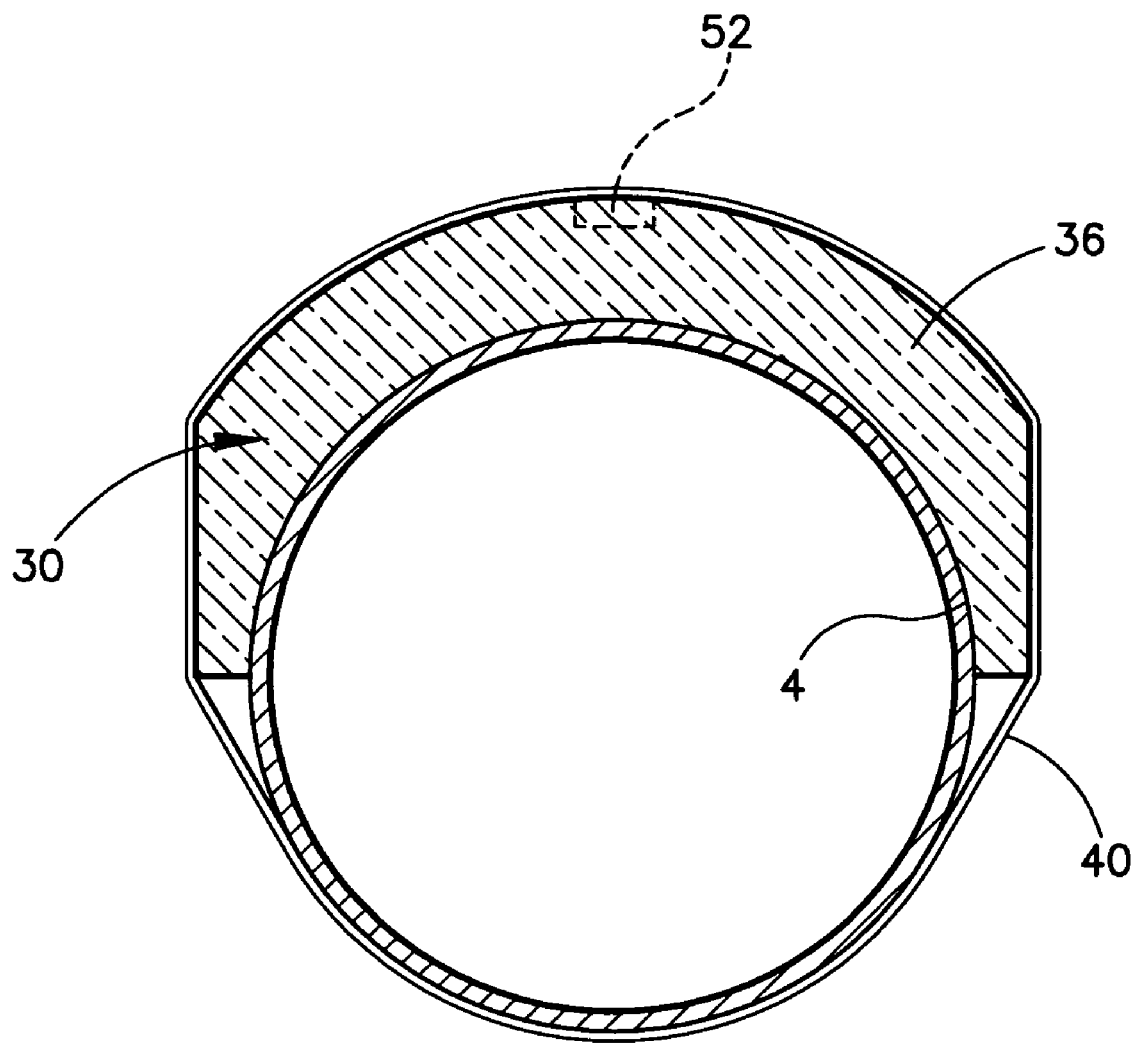
FIG. 6 is a cross-sectional view of the embodiment of FIG. 1 overlying a pipe.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

II. Pipe Reinforcement System

Referring to FIG. 1, an embodiment of the present invention a pipe reinforcement system are generally indicated by reference numeral 10, overlying a pipe section 2 having an inner and outer elbow surfaces 8, 6 separated by a pipe opening. The pipe reinforcement system 10 includes a plurality of tiles 30 generally secured to and overlying the pipe section 4.

In operation, the process pipe 4 is provided with inner and outer elbow surfaces 8, 6, the process pipe 4 being overlaid with plural tiles 30 having a complementary inner arcuate surface 32, the tiles 30 forming an interlocked surface as each tile 30 is connected to each other by an engaging structure 50, the tiles 30 being secured to the pipe 4 with a tile support 40 which encircles both the tiles 30 and the process pipe 4 providing a reinforced pipe system 10 for transporting abrasive material therethrough.

Typical applications for the system 10 may include, but are not limited to, pneumatic processes where abrasive materials are conveyed along the interior of the pipe section 4. Other conveying applications may include industrial, manufacturing, process, and chemical applications where abrasive materials are conveyed from one location to another through the pipe section 4. Although over time, the abrasive materials may wear through a turbulent section of a standard section of process pipe requiring frequent repairs and replacements. The pipe reinforcement system 10, when installed at the turbulent section of the conveying process, may inhibit or reduce the frequency of repairing or replacing the pipe section 4.

The pipe section 4 may include a pair of connectors 10 for connecting the pipe section 4 to surrounding process pipes (not shown), such as but not limited to plane ends for use with compression fittings, flanged ends, grooved ends, two-piece shaft collars, threaded collars, set screw collars, one-piece couplings, two-piece couplings, set screw couplings, keyless locking assemblies, quick-release couplings and specially designed ends for use with a particular piping schematic.

A single tile 30 is illustrated in FIGS. 2-3 with a first sidewall 36 extending between an inner and an outer tile surface 32, 34. FIG. 3 illustrates a second sidewall 38 opposite the first sidewall 36 and also extending between inner and outer tile surfaces 32, 34. The sidewalls 36, 38 may have varying designs, but in general provide for ¼ inch of material along the side of the pipe section 4 with around ¾ inch of material along the back of the pipe section 4. In general, the tile 30 is complementary shaped for pipe or tubing having an outside diameter generally ranging from 2 to 10 inches. In one embodiment the tile sidewalls 36, 38 may generally be ¾" thick fabricated from a solid ceramic material that wraps around the back of the pipe section or elbow 4. Once the pipe section has worn through, the abrasion is then transferred to the ceramic tile. The metal core also acts as a static conductor.

The interlocking engaging structure 50 is also illustrated with a tab 52 associated with the first sidewall 36 and an engaging receiver 54 associated with the second sidewall 38. The first and second sidewalls 36, 38 having a generally complementary structure with the tab and engaging receiver providing an interlocking engaging structure, generally located in proximity to each other such as, but not limited to, on the back of adjacent tiles 30 as illustrated in FIG. 4. In one embodiment, adjacent tiles 30 snap together and are then secured, providing hoop support for the system 10, and resisting collapse.

A plurality of tiles 30 are shown in FIG. 4, each tile 30 mechanically aligned along the pipe section 4, the tab 52 being generally located on a first tile 30, the receiver 54 being generally located on an adjacent tile 30, wherein the tab 52 engages the receiver 54 for aligning the pipe system 10. The pipe section 4 is illustrated in FIG. 4 with an arcuate surface or elbow, with the tile 30 being complementary configured for positioning along the tile 30 arcuate inner surface 32 on the pipe. In general, the arcuate pipe section 4 may have a diameter between 2 to 10 inches. A portion of the pipe section 4 of FIG. 4 is illustrated in FIG. 5, with inner and outer portions, 8, 6. The tiles 30 are illustrated on the elbow outer portion 6 of the pipe section 4, where the inner arcuate surface 32 of the tile 30 generally circumscribes the outer portion 6 of the pipe section 4.

The tiles may be alternatively arranged, however, in general, they are placed along the turbulent or impact region of the pipe 4, which in an arcuate shaped pipe, is generally around the elbow outer portion 6. Typically, the impact or turbulent section of the process pipe is where the pipe 4 may be subject to excessive wear from any conveyed abrasive materials. At the impact region, the abrasive materials may cause excessive wear along such as along the back and sides of the arcuate pipe section 4. The use of the tile 30 provides a way to minimize the effect of the abrasive material flowing through the pipe section 4, by providing a reinforcement surface in the event any portion or portions of the pipe section 4 becomes worn. Use of the pipe reinforcement system 10 may allow the conveying process to continue without the need to replace or repair a worn section of pipe. Some examples of abrasive materials may include particles having a diameter of three-eights of an inch or larger, however, other materials may be conveyed using the pipe reinforcement system.

The tiles may be fabricated from a silicate, ceramic, carbon steel, stainless steel or alumina type material. Use of ceramic in the tiles 30 may provide a highly abrasive resistant surface having a hardness generally greater than 9 along the turbulent section of pipe may provide for a higher density of material which may reduce the wear out of the conveying pipe section 4 by providing a secondary, backup material substrate. Alternatively, the use of a reinforcing ceramic material may provide for a more regular wear pattern, reducing any negative impact on the process stream within the pipe section 4. If a ceramic material is utilized, the PEI rating of the material should generally be greater than 5 on the PEI scale and may be fabricated from a number of different ceramic clay materials or compositions. Alternatively, the tile 30 may be fabricated from a solid alumina material which may allow for a tile having an arcuate surface adapted for a wider range of arcuate pipe sections, the alumina tiles being generally configured to reinforce the arcuate pipe section 4. In one embodiment, the alumina material generally includes greater than 90% alumina material.

The tiles 30 are configured to transition between the pipe section 4 and a surrounding conveying pipe in communication with the pipe section 4 for conveying the abrasive material through the process. In the illustrated embodiment, the tiles 30 allow for a continuous transition between the conveying pipe (not shown) and the pipe section 4, without the need for extra transitions, flanges or additional pipe sections. This continuous transition allows the pipe system 10 to be uniformly integrated into existing process systems without changing the overall flow characteristics of the process.

FIG. 6 illustrates a tile support 40, positioned for securing the tile 30 to the pipe section 4. As illustrated, the tile support 40 secures the tiles 30 with the inner arcuate surface 32 in association with the elbow outer portion 6, the tile 30 being generally secured to the pipe section 4. The tile support 40 may include but is not limited to mechanical fasteners, like metal fasteners or weldable tile, mechanically fastening the tile 30 to the pipe section 4. Additional economic benefits may be provided by utilizing a hardened fabric substrate such as but not limited to hardened fiberglass cloth or polyester in which a fiberglass tape or adhesive backed fiberglass material is wrapped around the tile 30 and the pipe section 4 for securing the tile 30 to the pipe section 4.

The tile support 30 may also be adapted to receive an epoxy coating (not shown) for additional strength and protection of the pipe reinforcement system 10, the epoxy coating forming a hard cast like surface. In addition, the epoxy coated reinforcement system 10 may also provide additional features including insulating the process pipe and maintaining the internal temperature of the conveyed abrasive material.

FIG. 6 also illustrates the first sidewall 36 extending between the outer arcuate surface 34 and the inner arcuate surface 32, the inner arcuate surface 32 positioned adjacent to the pipe section 4. The tab 52 is also illustrated in association with the first sidewall 36 adapted to receive the engaging receiver 54.

It will be appreciated that various other materials, configurations and embodiments may fall within the scope of the present invention. While certain forms of the present invention have been illustrated and described herein, it is not to be limited to the specific materials, forms or arrangement of parts described and shown.

Having thus described the invention, what is claimed as new and desired to be secured by Letters Patent is as follows:

1. A pipe reinforcement system comprising:
   a pipe section including inner and outer elbow surfaces separated by a pipe opening,
   a plurality of adjacent ceramic tiles overlying the pipe section, each of said tiles having a generally arcuate inner surface with an arcuate outer surface and opposing first and second sidewalls extending between said inner and outer arcuate surfaces,
   a tile support securing said tiles to said pipe section for positioning said inner arcuate surface in contact with said outer elbow surface wherein said pipe section is reinforced; and
   a tile engaging structure including a tab receiver configured for receiving a tab associated with one of said adjacent tiles first and second sidewalls, whereby said tiles are mechanically aligned along said pipe section.

2. The system according to claim 1 further comprising:
a stiffing member encasing said tile support, and
said tile support encircling said tiles overlying said pipe section, whereby said member and said tile support provide a durable pipe reinforcement system.

3. The system according to claim 2 wherein said stiffing member is a reinforced fiber covering.

4. A method for reinforcing a process pipe including the steps of:
providing a process pipe having an inner and outer elbow surface,
overlying the process pipe with a plurality of adjacent ceramic tiles overlying the process pipe, each of said tiles having a generally arcuate inner surface with an arcuate outer surface and opposing first and second sidewalls extending between said inner and outer arcuate surfaces,
connecting the adjacent ceramic tiles with an engaging structure including a tab receiver configured for receiving a tab associated with one of said adjacent tiles first and second sidewalls, whereby said tiles are mechanically aligned along said tile section, and
securing the tiles to the process pipe with a tile support encircling the tiles and the process pipe.

* * * * *